(12) United States Patent
Ajisaka

(10) Patent No.: US 8,393,669 B2
(45) Date of Patent: Mar. 12, 2013

(54) VEHICLE FRAME STRUCTURE

(75) Inventor: Satoshi Ajisaka, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 143 days.

(21) Appl. No.: 12/999,098

(22) PCT Filed: Jun. 22, 2009

(86) PCT No.: PCT/IB2009/006015
§ 371 (c)(1),
(2), (4) Date: Dec. 15, 2010

(87) PCT Pub. No.: WO2009/156819
PCT Pub. Date: Dec. 30, 2009

(65) Prior Publication Data
US 2011/0083923 A1    Apr. 14, 2011

(30) Foreign Application Priority Data

Jun. 24, 2008 (JP) .................................. 2008-164175

(51) Int. Cl.
*B62D 21/15* (2006.01)
(52) U.S. Cl. ........... 296/187.09; 296/187.1; 296/203.02; 296/205
(58) Field of Classification Search ............. 296/187.03, 296/187.09, 187.1, 193.07, 193.09, 203.02, 296/203.04, 204, 205
See application file for complete search history.

(56) References Cited

U.S. PATENT DOCUMENTS

| | | | |
|---|---|---|---|
| 2,113,399 A | 4/1938 | Dietrich | |
| 2,212,636 A | 8/1940 | Dorris | |
| 3,879,073 A | 4/1975 | Norlin | |
| 5,074,587 A * | 12/1991 | Schwede et al. | 280/781 |
| 6,270,153 B1 * | 8/2001 | Toyao et al. | 296/204 |
| 7,469,957 B1 * | 12/2008 | Boettcher | 296/193.07 |
| 2007/0187994 A1 | 8/2007 | Yasuhara et al. | |

FOREIGN PATENT DOCUMENTS

| | | |
|---|---|---|
| JP | 40-27205 | 11/1965 |
| JP | 49-95318 | 9/1974 |

(Continued)

OTHER PUBLICATIONS

International Search Report in International Application No. PCT/IB2009/006015; Mailing Date: Sep. 4, 2009.

(Continued)

*Primary Examiner* — Glenn Dayoan
*Assistant Examiner* — Jason S Daniels
(74) *Attorney, Agent, or Firm* — Finnegan, Henderson, Farabow, Garrett & Dunner, LLP

(57) ABSTRACT

A vehicle frame structure includes a tunnel portion provided in a floor and left and right side members. Each of the side members includes a front side member, an inner member, and an outer member. The inner and outer members branch off from the front side member in a direction toward the rear of the vehicle. The inner member extends toward the rear of the vehicle along the tunnel portion. The inner members of the left and right side members are connected together by a plurality of connecting portions in the longitudinal direction of the vehicle at least at a location corresponding to a front portion side of the tunnel portion. These connecting portions break when a front impact load is input to at least one of the side members.

8 Claims, 15 Drawing Sheets

FOREIGN PATENT DOCUMENTS

| | | |
|---|---|---|
| JP | 2000-238667 | 9/2000 |
| JP | 2001-287670 | 10/2001 |
| JP | 2003-2248 | 1/2003 |
| JP | 2006-213093 | 8/2006 |
| JP | 2007-290426 | 11/2007 |

OTHER PUBLICATIONS

Notification of Reason(s) for Refusal in Japanese Application No. 2008-164175; Drafting Date: Jan. 14, 2010.

Written Opinion of the International Searching Authority in International Application No. PCT/IB2009/006015; Mailing Date: Sep. 4, 2009.

Response to Written Opinion of the International Searching Authority in International Application No. PCT/IB2009/006015 (Dec. 9, 2009).

Notification of the First Office Action for Chinese Appl. No. 200980120409.4 dated Apr. 6, 2012.

* cited by examiner

VEHICLE FRAME STRUCTURE

CROSS-REFERENCE TO RELATED APPLICATIONS

This application is a national phase application of International Application No. PCT/IB2009/006015, filed Jun.22, 2009, and claims the priority of Japanese Application No. 2008-164175, Jun. 24, 2008, the contents of both of which are incorporated herein by reference.

BACKGROUND OF THE INVENTION

1. Field of the Invention

The invention relates to a vehicle frame structure.

2. Description of the Related Art

Japanese Patent Application Publication No. 2003-2248 (JP-A-2003-2248) describes a structure in which a floor tunnel front and a floor tunnel rear, which are formed of extruded material that forms a floor tunnel which extends in the longitudinal direction of the vehicle, are connected together by a cast joint. When a front impact load is input to the floor tunnel from the front of the vehicle during a frontal collision of the vehicle, this joint (only this joint) deforms, thereby absorbing the energy from the collision.

However, with a structure in which only the joint of the floor tunnel deforms during a frontal collision of the vehicle, as in the related art described in JP-A-2003-2248, the floor deforms in a localized area, making it difficult to distribute the front impact load over a wide area of the vehicle frame.

SUMMARY OF THE INVENTION

This invention thus provides a vehicle frame structure that is able to be made lighter while ensuring the ability to absorb shock during a frontal collision of a vehicle.

A first aspect of the invention relates to a vehicle frame structure that includes a tunnel portion provided in a floor, and left and right side members. Each of the side members includes i) a front side member which is at the front of the vehicle and extends in the longitudinal direction of the vehicle on the corresponding left or right side in the vehicle width direction, ii) an inner member that is toward the inside in the vehicle width direction, and iii) an outer member that is toward the outside in the vehicle width direction. The inner member and the outer member branch off from the front side member in a direction that is toward the rear of the vehicle, and the inner member extends toward the rear of the vehicle along the tunnel portion. The inner members of the left and right side members are connected together by a plurality of connecting portions in the longitudinal direction of the vehicle at least at a location corresponding to a front portion side of the tunnel portion. These connecting portions break when a front impact load is input to at least one of the side members.

With the vehicle frame structure according to this aspect, each of the side members branches off in a direction toward the rear of the vehicle from the front side member at the front of the vehicle into the inner member which is toward the inside in the vehicle width direction and the outer member which is toward the outside in the vehicle width direction. Accordingly, the front impact load input to the side members (i.e., the front side members) during a frontal collision of the vehicle is distributed and transmitted to the inner members and the outer members. Also, the inner members extend toward the rear of the vehicle along the tunnel portion of the floor, so the front impact load is also transmitted toward the rear of the vehicle along this tunnel portion. Further, the inner members are connected together at a plurality of connecting portions in the longitudinal direction of the vehicle at least at a location corresponding to the front portion side of the tunnel portion. These connecting portions are designed to break when a front impact load is input to the one or both side members. Having the connecting portions break from the front impact load in this way enables the side members to deform not only at the area of the front side members, but also the area of the inner members which are located at the front portion of the tunnel portion. As a result, the shock during a frontal collision is able to be better absorbed. Accordingly, localized deformation of the floor is able to be suppressed, making it possible to reduce the number of reinforcements, not shown, for reinforcing the floor, which in turn enables the weight of the vehicle frame to be reduced.

Also, in the vehicle frame structure described above, the front side members and the inner members may be formed generally straight when viewed from the side of the vehicle.

Forming the front side members and the inner members of the side members generally straight when viewed from the side of the vehicle in this way enables the front impact load input to the side members (i.e., the front side members) during a frontal collision of the vehicle to be transmitted directly to the inner members that extend toward the rear of the vehicle along the tunnel portion of the floor. As a result, bending deformation of the side members upward in the vertical direction of the vehicle is able to be suppressed, thereby making it possible to suppress localized deformation of the floor.

Also, in the vehicle frame structure described above, the inner members may be connected together inside the tunnel portion.

Connecting the inner members together inside the tunnel portion in this way enables the space below the tunnel portion of the floor, as well as the space below the portion of the floor other than the tunnel portion, to be used effectively.

Also, in the vehicle frame structure described above, one inner member may be connected to one side wall portion, which is on one side in the vehicle width direction, of the tunnel portion and the other inner member may be connected to the other side wall portion, which is on the other side in the vehicle width direction, of the tunnel portion.

Having one inner member be connected to one side wall portion, which is on one side in the vehicle width direction, of the tunnel portion and the other inner member be connected to the other side wall portion, which is on the other side in the vehicle width direction, of the tunnel portion in this way enables the space below the tunnel portion of the floor to be used more effectively.

Also, in the vehicle frame structure described above, a power unit may be arranged behind the inner members in the longitudinal direction of the vehicle, and opposing the rear ends of the inner members in the longitudinal direction of the vehicle.

Arranging the power unit behind the inner members in the longitudinal direction of the vehicle, and opposing the rear ends of the inner members in the longitudinal direction of the vehicle in this way enables the load from the inertia mass of the power unit to be transmitted forward of the side members via the inner members during a frontal collision of the vehicle. Therefore, the vehicle frame can be made lighter while ensuring the ability to absorb the shock during a frontal collision in a vehicle which has the power unit mounted in the rear.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
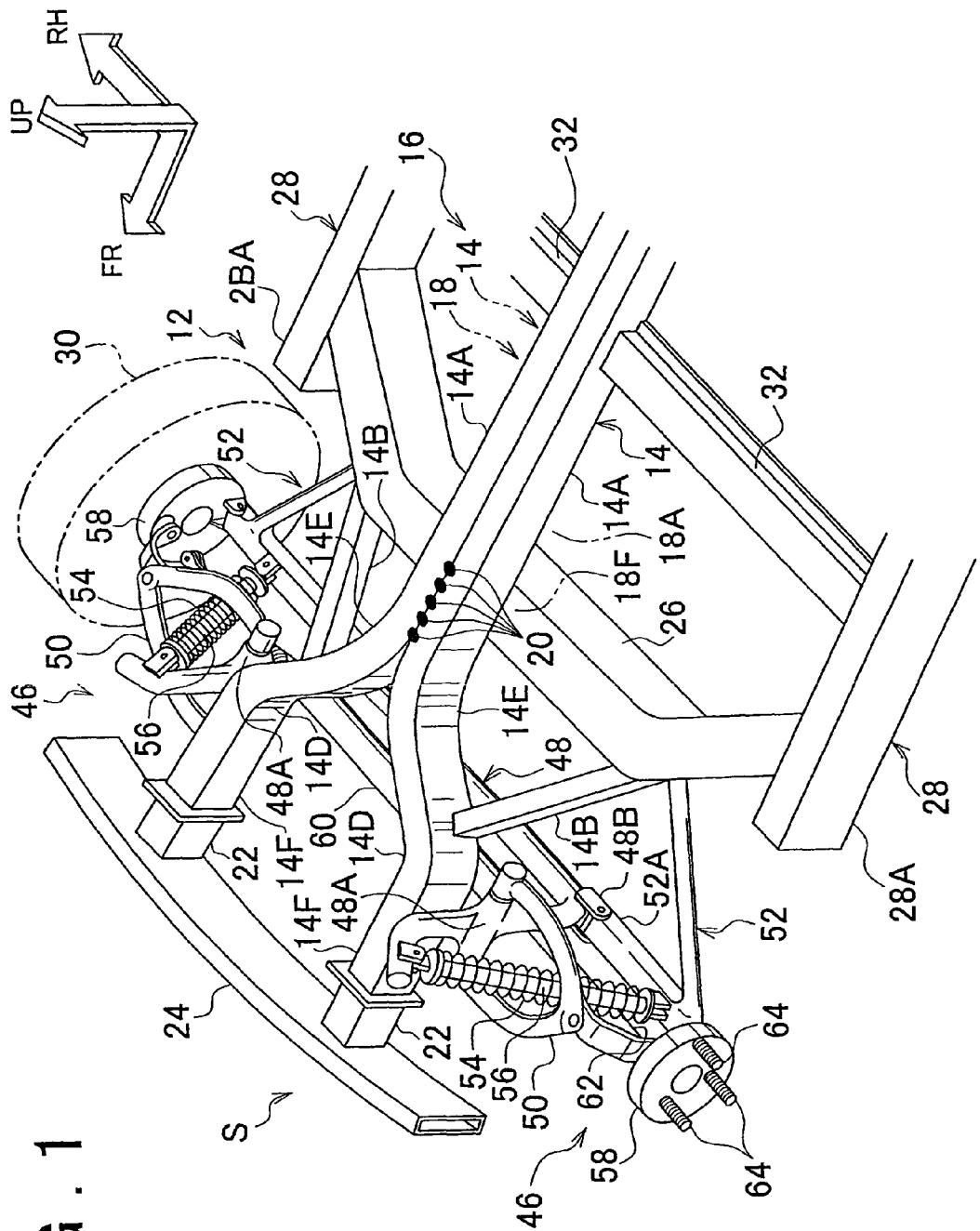
FIG. 1 is a perspective view of a vehicle frame structure.

Example embodiments of the present invention will be described in greater detail below with reference to the accompanying drawings. In FIG. 1, a vehicle frame structure S according to an example embodiment relates to a frame structure of a vehicle 12 having a power unit (see FIG. 2) arranged in the rear, for example. This vehicle frame structure S has side members 14.

Figure 2:
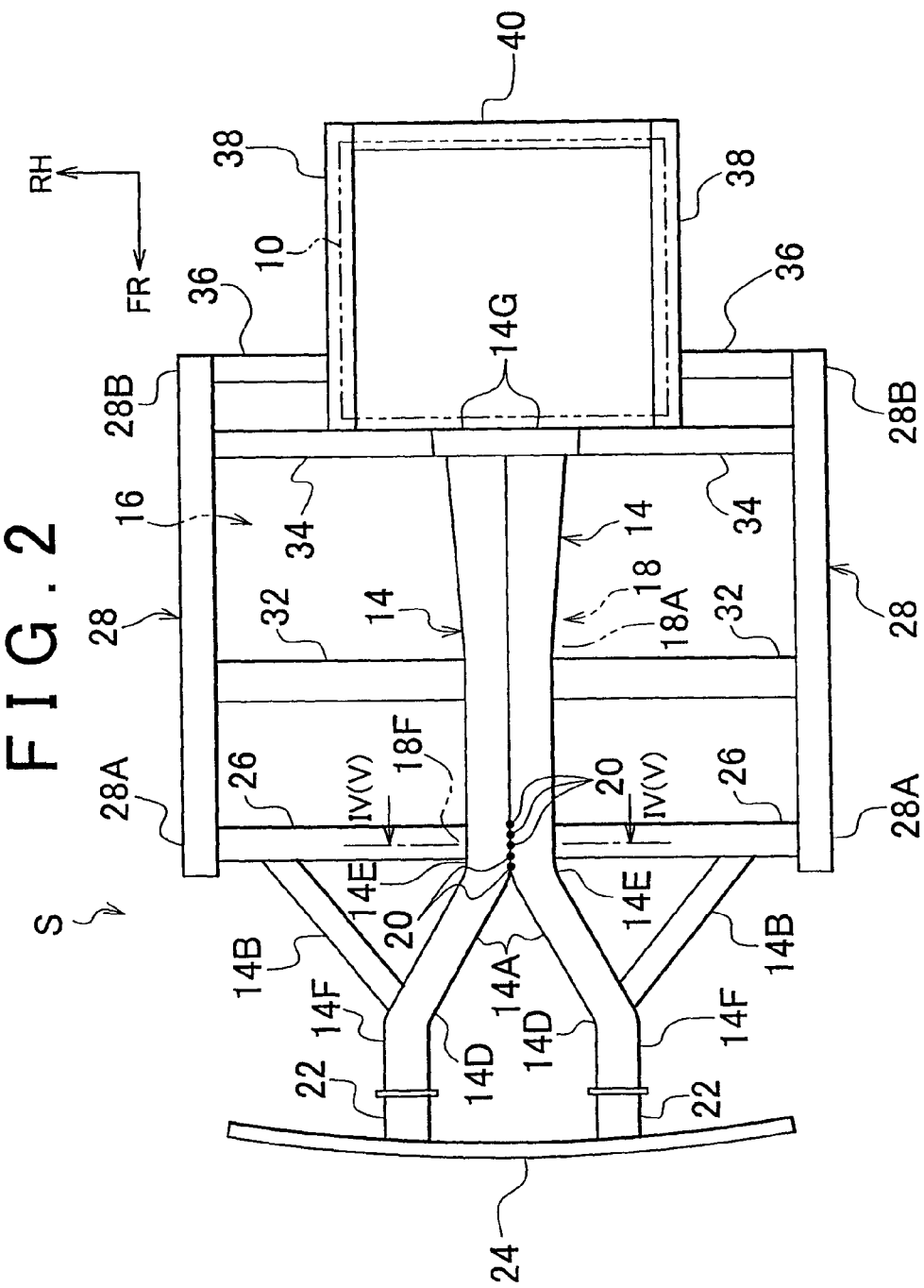
FIG. 2 is a plan view of the vehicle frame structure.

As shown in FIGS. 1 and 2, these side members 14 are frame members which extend in the longitudinal direction of the vehicle on both sides in the vehicle width direction. Each of these side members 14 branches off in a direction toward the rear of the vehicle from a front side member 14F at the front of the vehicle into an inner member 14A which is toward the inside in the vehicle width direction and an outer member 14B which is toward the outside in the vehicle width direction. The inner members 14A extend toward the rear of the vehicle along a tunnel portion 18 (see FIG. 4)) of a floor 16 and are connected together at a plurality of connecting portions 20 in the longitudinal direction of the vehicle at least at a front end portion 18F of the tunnel portion 18. These connecting portions 20 are designed to break when a front impact load is input to one or both of the side members 14. Incidentally, in the example shown, there are five connecting portions 20, but it is not necessary that all five of these connecting portions 20 break when a front impact load is input to the side members 14. However, it is preferable that two connecting portions 20 that are toward the front in the vehicle longitudinal direction, for example, break in order to ensure allow the inner members 14 to deform (i.e., ensure the deformation stroke of the inner members 14) while suppressing deformation of the floor 16. Also, the connecting portions 20 may also be provided at a portion other than the front end portion 18F of the tunnel portion 18.

A bumper reinforcement 24 is provided via so-called crash boxes 22 on the tip ends of the front side members 14 of the side members 14. The front side members 14F and the inner members 14A of the side members 14 are such that there are no seams between them.

Figure 3:
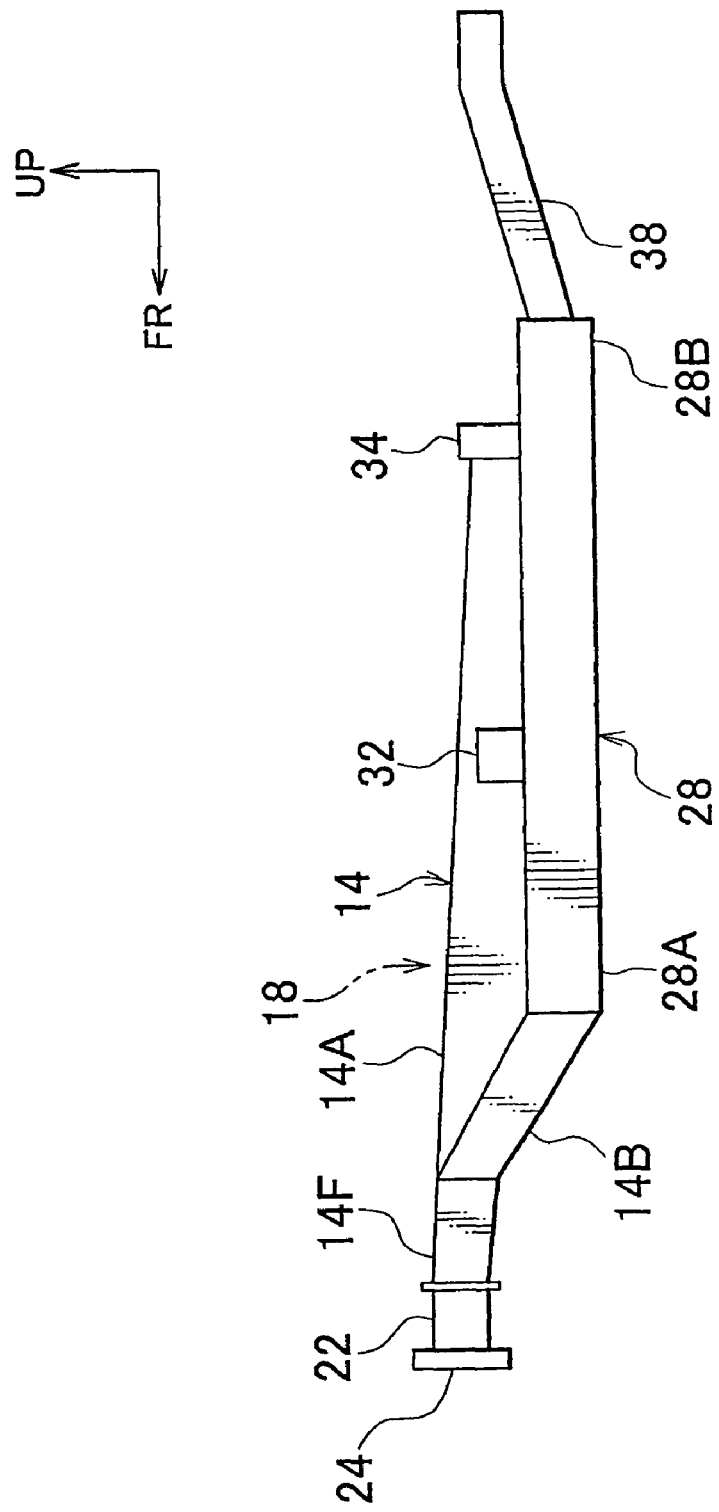
FIG. 3 is a side view of the vehicle frame structure.

The front side members 14F are portions of the side members 14 which extend in the longitudinal direction of the vehicle at the front of the vehicle. Also, the inner members 14A are portions which extend from the rear end portions of the front side members 14F diagonally back toward the front end portion 18F of the tunnel portion 18 that is in the center of the floor 16 in the vehicle width direction, and then extend from the front end portion 18F toward the rear of the vehicle along the tunnel portion 18. Accordingly, the junctions between the front side members 14F and the inner members 14A are formed as curved portions 14D, and the areas of the inner members 14A that are right in front of the connecting portions 20 in the longitudinal direction of the vehicle are formed as curved portions 14E. As shown in FIG. 3, the front side members 14F and the inner members 14A of the side members 14 are straight when viewed from the side of the vehicle.

The outer members 14B of the side members 14 are formed as separate members from the inner members 14A and the front side members 14F, for example. The front ends of the outer members 14B are connected to the surfaces of the front side members 14F that face toward the outside in the vehicle width direction, at locations near the rear end portions of the front side members 14F, while the rear ends of the outer members 14B are connected to the front surface of a cross member 26. As shown in FIG. 1, the cross member 26 is arranged below the side members 14 in the vertical direction of the vehicle. Therefore, the outer members 14B of the side members 14 each are arranged slanted downward in the vertical direction of the vehicle from the front end toward the rear end when viewed from the side of the vehicle, as shown in FIG. 3.

As shown in FIG. 2, side sills 28 which extend in the longitudinal direction of the vehicle are arranged on the lower side portions of the vehicle. These side sills 28 are hollow and have a generally rectangular-shaped closed cross-section. The front end portions 28A of the side sills 28 are arranged behind front wheels 30 in the longitudinal direction of the vehicle (see FIG. 1). The side sills 28 on both sides are connected together by a plurality of cross members 26, 32, 34, and 36 that extend in the vehicle width direction. The cross member 26 is a member that connects the front end portions 28A of the side sills 28 together. FIG. 1 shows both ends of the cross member 26 curved toward the rear of the vehicle, while FIG. 2 shows them straight. The shape of the end portions of the cross member 26 is arbitrary.

A pair of rear side members 38 which extend toward the rear of the vehicle are provided separated from one another in the vehicle width direction on the cross members 34 and 36 located at the rear portion of the floor 16. In this case, the cross members 36 are members that connect the rear end portions 28B of the side sills 28 with the rear side members 38. The rear side members 38 are arranged protruding farther toward the rear of the vehicle than the cross members 36. The rear end portions of the rear side members 38 are connected together by a cross member 40 that extends in the vehicle width direction. The generally square area formed by the rear side members 38 and the cross member 40 serves as a space in which to mount a power unit 10. The power unit 10 is arranged opposing the rear ends 14G of the inner members 14A in the longitudinal direction of the vehicle.

Figure 4:
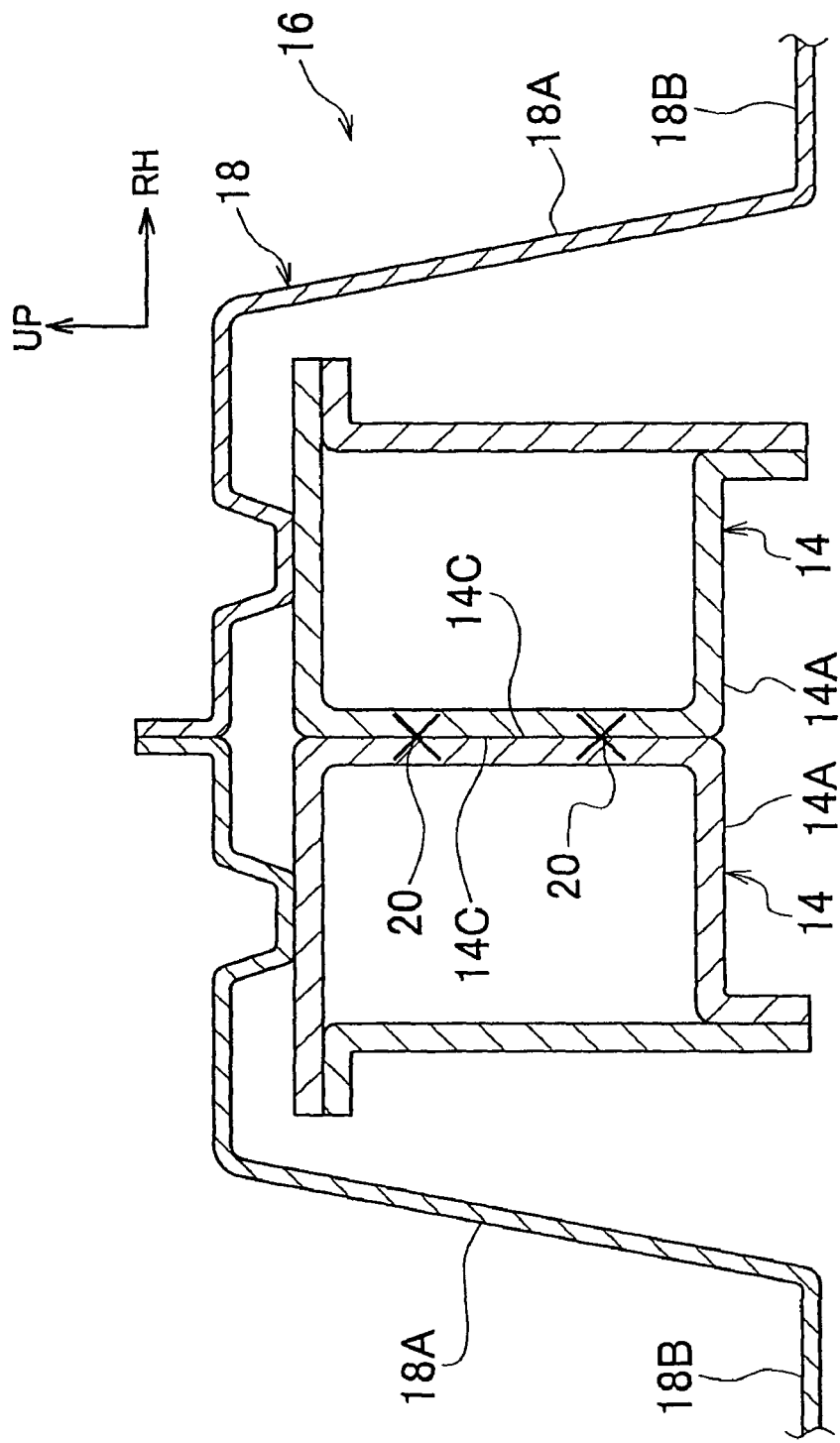
FIG. 4 is an enlarged perspective view taken along line IV-IV in FIG. 2 of a connecting portion of inner members.

As shown in FIG. 4, the side members 14 are formed with generally square closed cross-sections by joining steel sheets that have been press-formed. The inner members 14A are joined together at opposing vertical wall portions 14C by welding or bonding or the like. As a result, the inner members 14A are connected together in the tunnel portion 18. In this case, the tunnel portion 18 is a ridge-shaped portion that protrudes upward in the vertical direction of the vehicle in the center of the vehicle in the vehicle width direction, and extends in the longitudinal direction of the vehicle.

Figure 5:
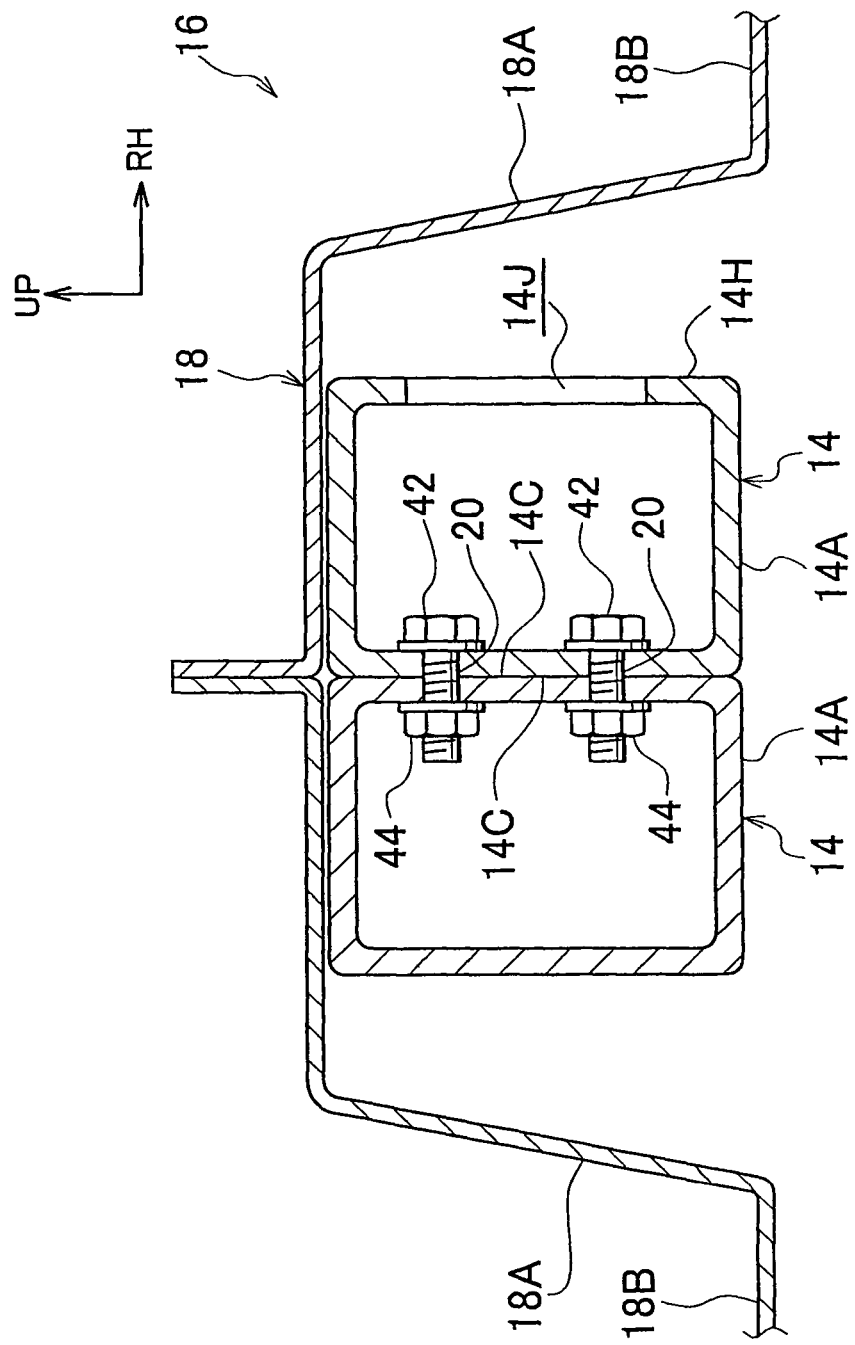
FIG. 5 is an enlarged perspective view taken along line V-V in FIG. 2 of a modified example of the connecting portions of the inner members.

Incidentally, the structure of the side members is not limited to this. For example, hollow extruded material that has generally square cross-section may also be used for each of the side members 14, as shown in FIG. 5. In the example shown in FIG. 5, the inner members 14A are fastened together at opposing vertical wall portions 14C using nuts 44 and bolts 42. The nuts 44 are fixed to the inside surface of the vertical walls 14C of the inner member 14 on the left side of the vehicle, for example, and a work hole 14J is provided in a vertical wall portion 14H that is on the outside in the vehicle width direction of the inner member 14A on the right side of the vehicle. The bolts 42 are inserted through this work hole 14J into the inner member 14A on the right side of the vehicle, and screwed into the nuts 44. Incidentally, the work hole 14J may be used as a weak portion for controlling the deformation of the side members 14 during a collision of the vehicle 12.

Figure 6:
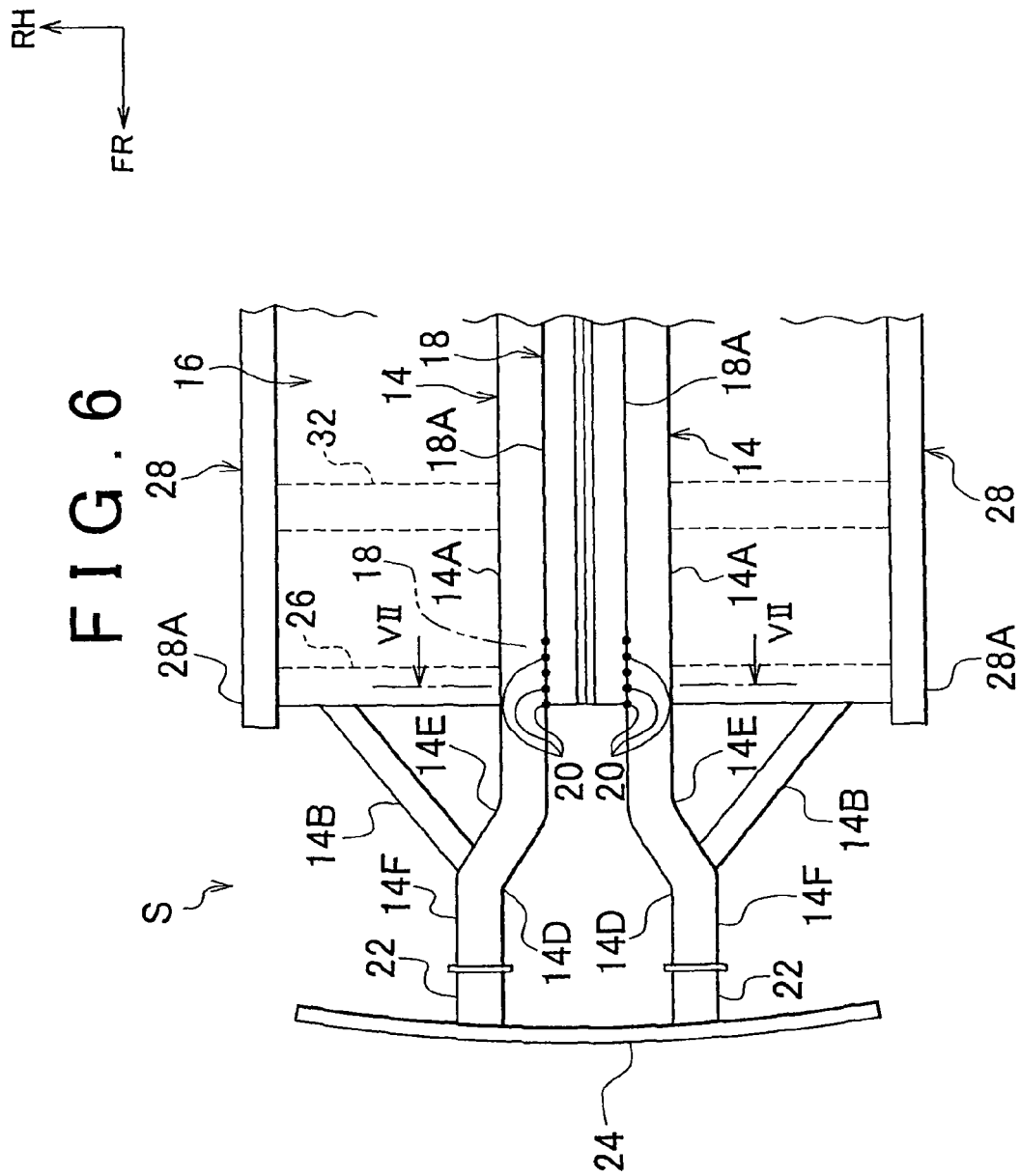
FIG. 6 is a plan view of a modified example in which the inner members are each connected to a side wall portion of a tunnel portion in the vehicle frame structure.
Figure 7:
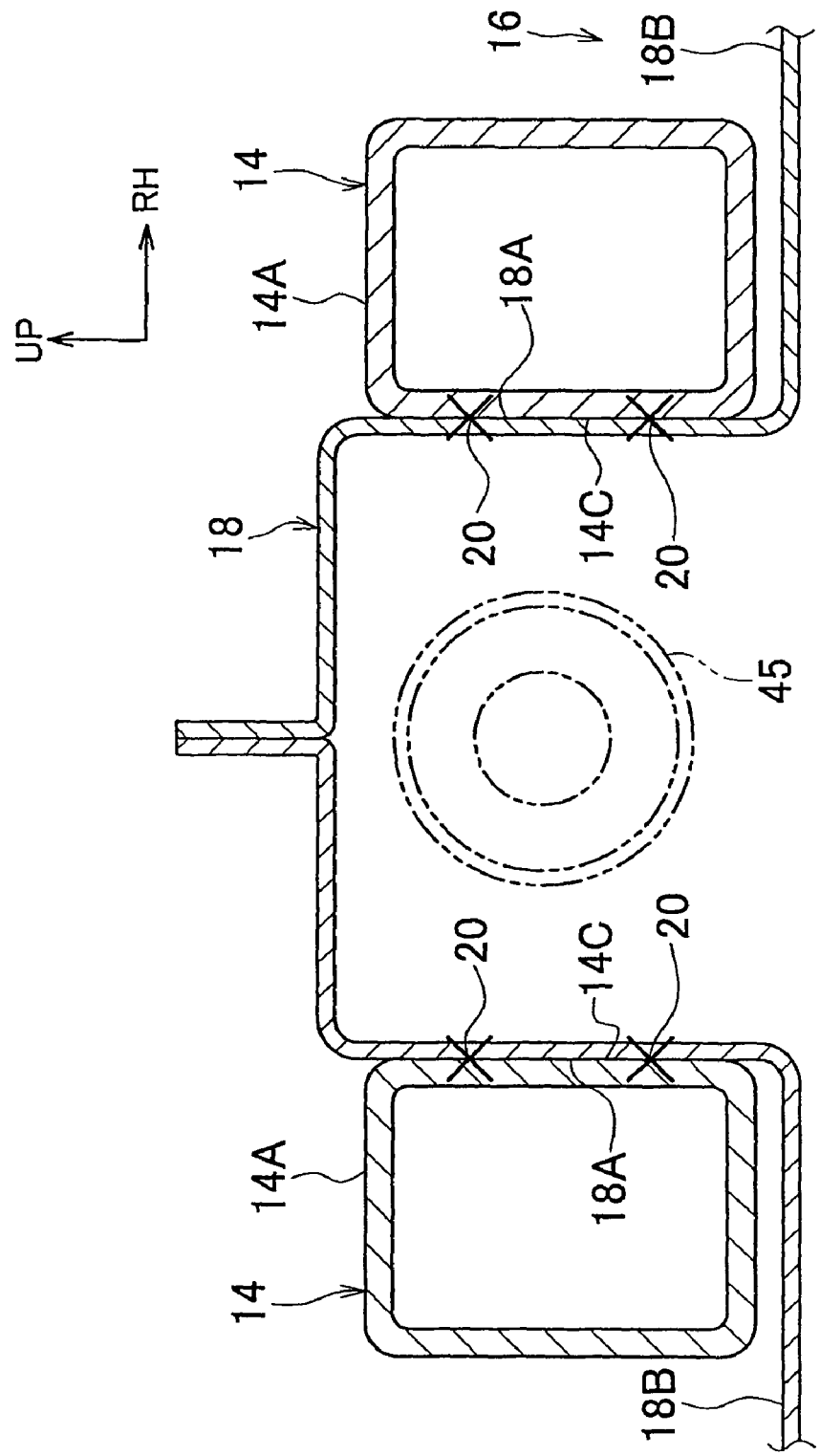
FIG. 7 is an enlarged perspective view taken along line VII-VII in FIG. 6 of the connecting portions of inner members.

Moreover, in the examples shown in FIGS. 6 and 7, the inner members 14A are connected to side wall portions 18A on the sides of the tunnel portion 18 in the vehicle width direction. More specifically, each of the inner members 14A is connected to the outside surface of one of the side wall portions 18A of the tunnel portion 18 in the vehicle width direction. In other words, the inner members 14A are connected to each other via the tunnel portion 18. In this example, the inner members 14A of the side members 14 do not pass through the tunnel portion 18, so an exhaust pipe 45 or the like is able to be arranged in the tunnel portion 18.

Figure 8:
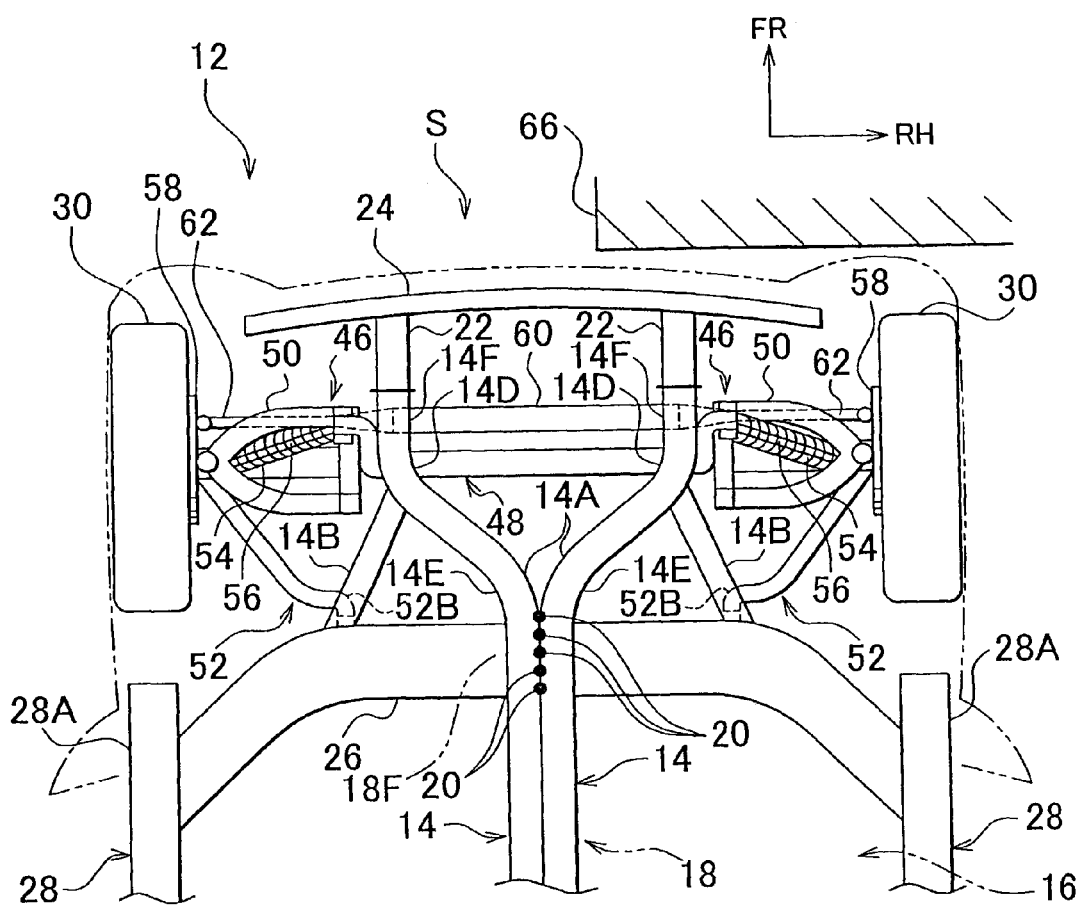
FIG. 8 is a plan view of the front of a vehicle just before impact during an offset collision in which the right front portion of the vehicle collides with a collision body.

In FIGS. 1 and 8, a suspension system 46 that suspends the front wheels 30 is provided in the front of the vehicle. This suspension system 46 is a double wishbone type suspension system, for example. As shown in FIG. 1, a suspension arm 48 which is generally U-shaped when viewed from the front of the vehicle, for example, is provided on each front side member 14F. An upper arm 50 is supported so as to be able to pivot in the vertical direction of the vehicle on a support portion 48A provided at one end portion of each suspension arm 48, and an inner end arm 52A which is toward the inside in the vehicle width direction and in front of a lower arm 52 is supported so as to be able to pivot in the vertical direction of the vehicle on a support portion 48B provided at the other end portion of each suspension arm 48. A shock absorber 56 with a coaxially provided coil spring 54 is connected between the lower arm 52 and the suspension arm 48, for example. An inner end portion 52B which is toward the inside in the vehicle width direction and to the rear of the lower arm 52 is supported so as to be able to pivot in the vertical direction of the vehicle near the rear end portion of each outer member 14B of the side member 14, for example, as shown in FIG. 8.

Hubs 58 for attaching the front wheels 30 are supported by both the outer end portions of the upper arms 50 and the outer end portions of the lower arms 52 in the vehicle width direction. Each of the hubs 58 is connected to a tie rod 62 of a steering gear box 60 and is thus able to be pivoted about a rotational axis that lies in the vertical direction of the vehicle, for example, by turning a steering wheel, not shown, which consequently displaces the tie rods 62 in the vehicle width direction. Also, as shown in FIG. 1, each hub 58 is provided with stud bolts 64 protruding outward in the vehicle width direction for fastening the front wheels 30 in place, for example. The steering gear box 60 is fixed to the front side members 14F, for example.

Figure 9:
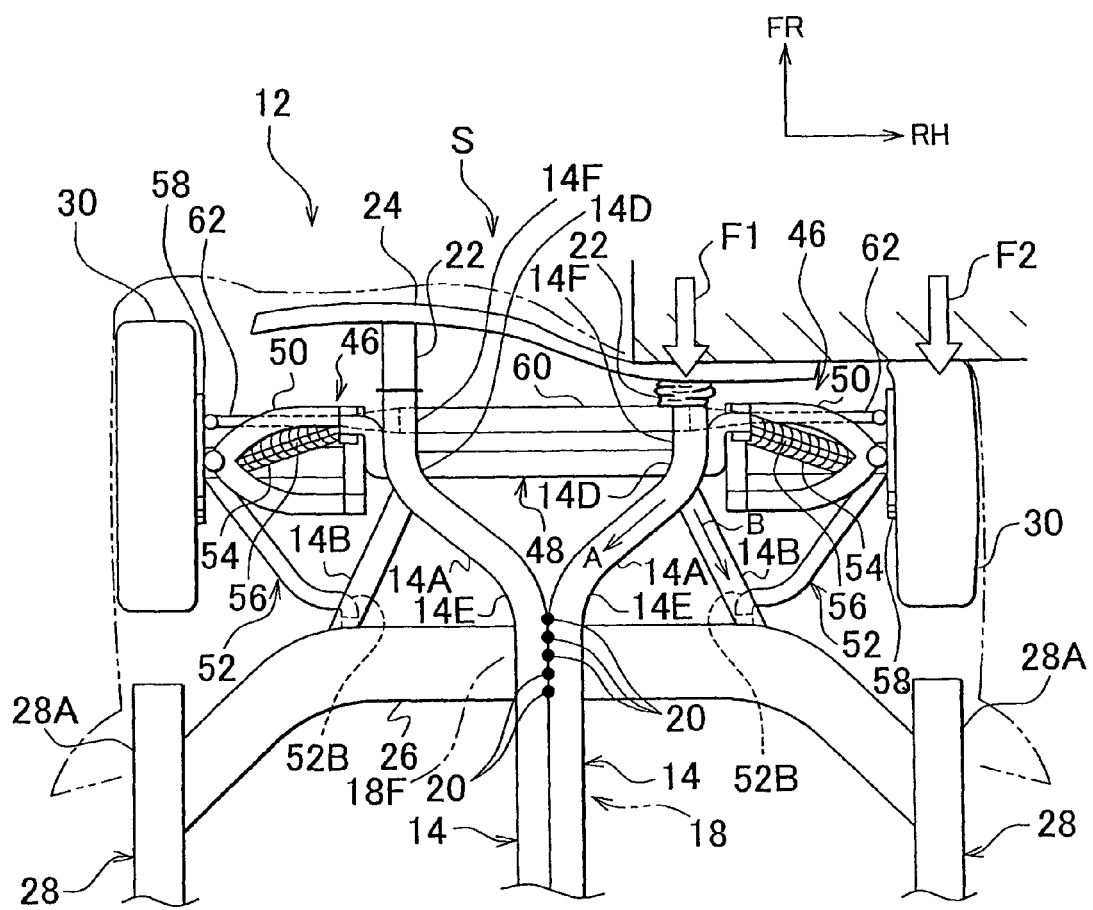
FIG. 9 is a plan view of the front of the vehicle at the beginning of impact during the offset collision in which the right front portion of the vehicle collides with the collision body.

(Operation) Next, the operation of the vehicle frame structure according to this example embodiment described above will be described. First, a case in which the right front portion, for example, of the vehicle 12 collides with a collision body 66 in an offset collision will be described with reference to FIGS. 8 to 11. When this kind of offset collision occurs, a front impact load F1 is input to the front side member 14F on the right side of the vehicle via the bumper reinforcement 24 and the crash box 22, as shown in FIG. 9. At this time, a certain degree of shock is absorbed by the crash box 22 axially compressing and deforming. Also, as the front portion of the vehicle continues to deform, a front impact load F2 from the collision body 66 is input to the front wheel 30 on the right side of the vehicle. In addition, at this time, the front impact load F1 is also transmitted to the left side of the vehicle, which is the side opposite the impacted side, via the bumper reinforcement 24, the suspension arm 48, and the steering gear box 60 and the like.

As described above, in the vehicle frame structure S according to this example embodiment, the side members 14 branch off in a direction toward the rear of the vehicle from the front side members 14F at the front of the vehicle into the inner member 14A and the outer member 14B. Therefore, at this time, the front impact load F1 input to the side members 14 (i.e., the front side members 14F) is distributed to the inner members 14A (in the direction of arrow A) and the outer members 14B (in the direction of arrow B). The front impact load F1 is transmitted, for example, to the cross member 26 as well as to the rear of the inner members 14A along the tunnel portion 18 in the longitudinal direction of the vehicle. The load transmitted to the cross member 26 is also transmitted to the side sills 28.

Also at this time, with the vehicle frame structure S according to this example embodiment, the front side members 14F and the inner members 14A of the side members 14 are formed straight when viewed from the side of the vehicle, as shown in FIG. 3, so the front impact load F1 (see FIG. 9) input to the side members 14 (i.e., the front side members 14F) during a frontal collision of the vehicle 12 is transmitted directly to the inner members 14A that extend toward the rear of the vehicle along the tunnel portion 18 of the floor 16. As a result, bending deformation of the side members 14 upward in the vertical direction of the vehicle is able to be suppressed, thereby making it possible to suppress localized deformation of the floor 16.

Figure 10:
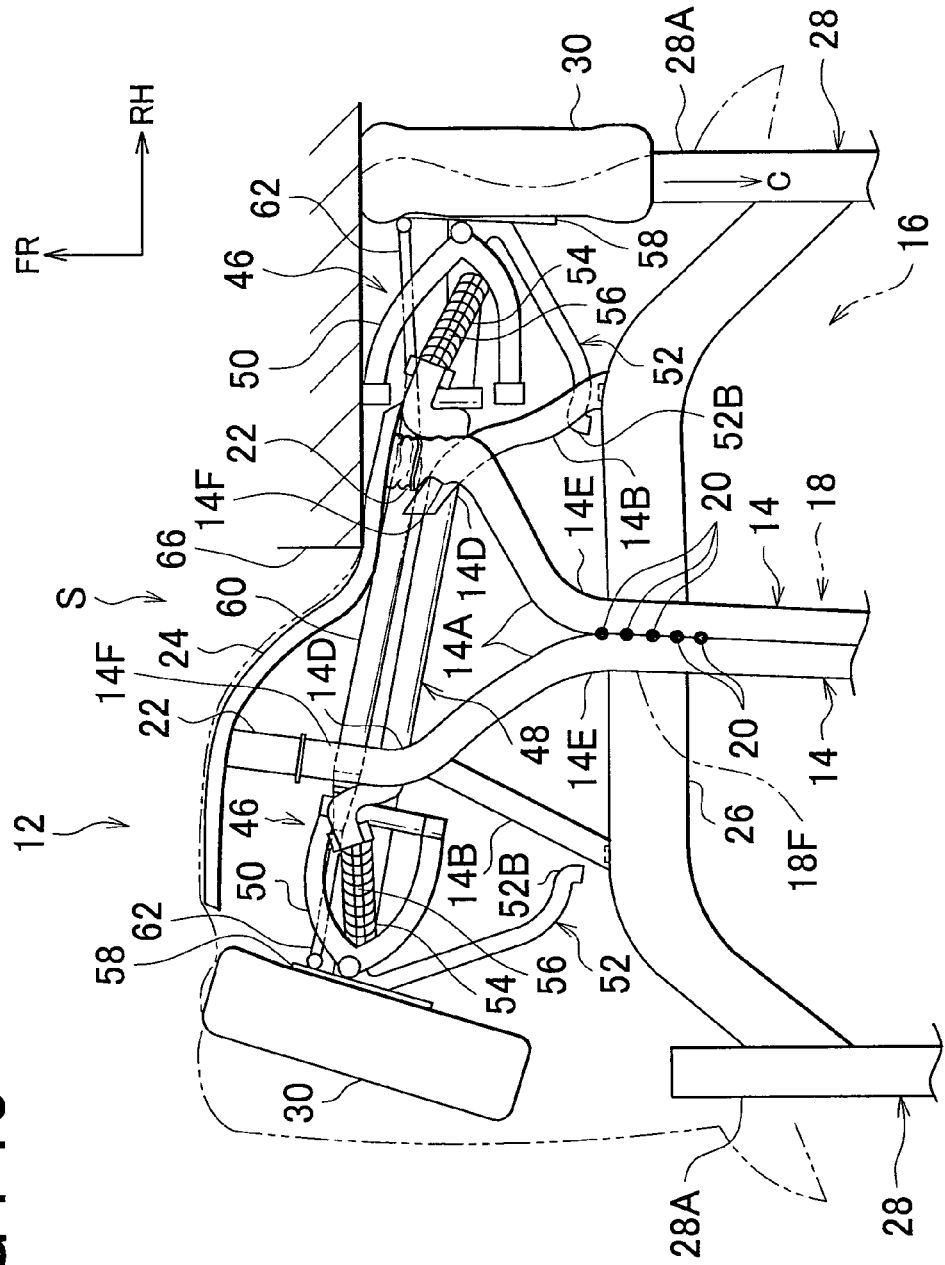
FIG. 10 is a plan view of the vehicle further deformed from the state shown in FIG. 9.
Figure 11:
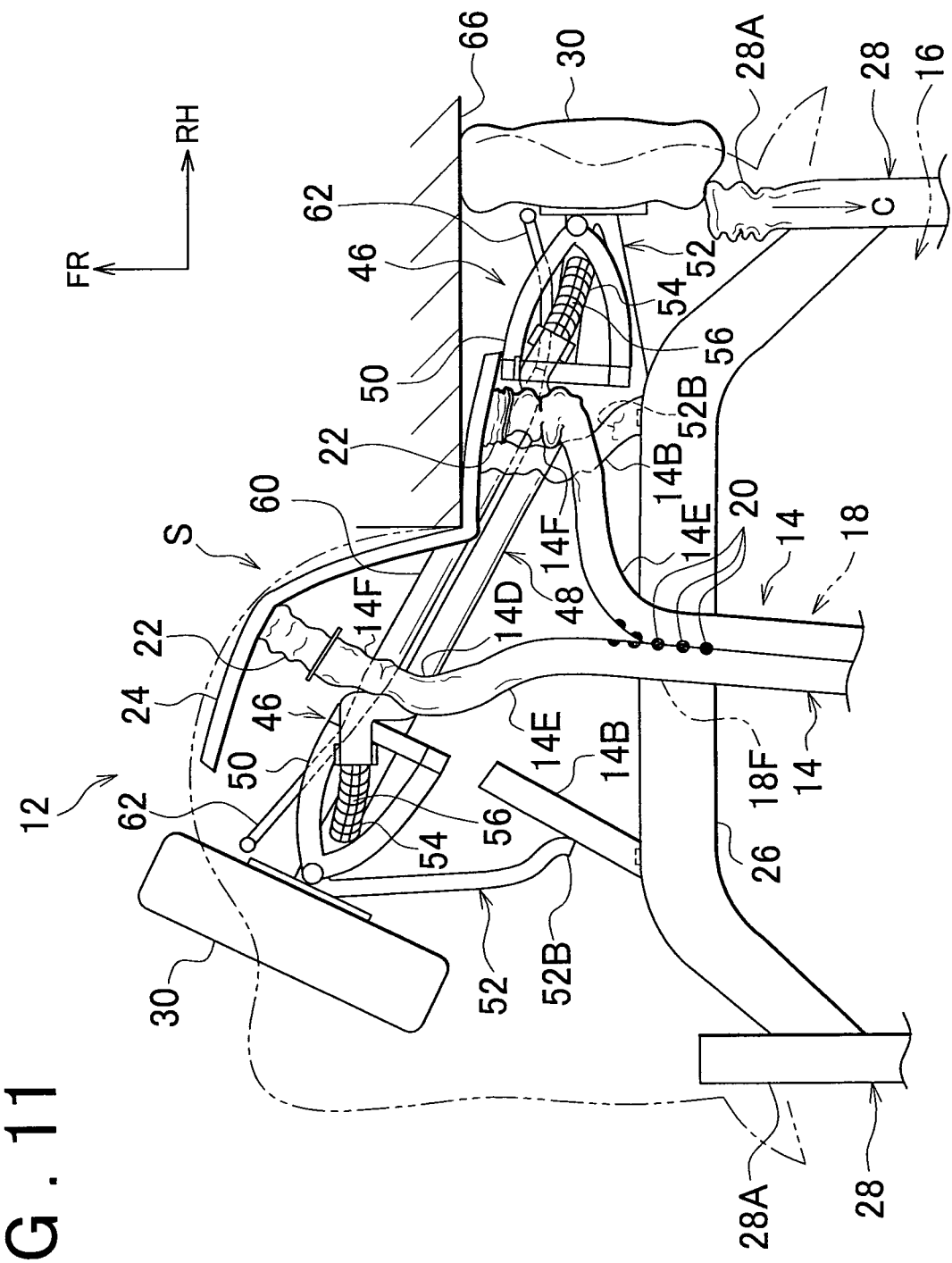
FIG. 11 is a plan view of the vehicle further deformed from the state shown in FIG. 10.

Moreover, the inner members 14A are normally connected together at a plurality of connecting portions 20 in the longitudinal direction of the vehicle at least at the front end portion 18F of the tunnel portion 18. However, as the front portion of the vehicle continues to deform from the front impact load F1 (see FIG. 9), some of the connecting portions, such as the two connecting portions 20 that are farthest forward, for example, break, as shown in FIGS. 10 and 11, and separate in the vehicle width direction (see FIG. 11). Having the connecting portions 20 break and separate in this way enables the energy from the impact to be absorbed. Also, the side members 14 are able to deform not only at the area of the front side members 14F, but also the area of the inner members 14A which are located at the front end portion 18F of the tunnel portion 18. That is, the crushable zone is able to be enlarged. As a result, the shock during a frontal collision is able to be effectively absorbed. As a result, localized deformation of the floor 16 is able to be suppressed, making it possible to reduce the number of reinforcements, not shown, for reinforcing the floor 16, which in turn enables the weight of the vehicle frame to be reduced. Incidentally, until the connecting portions 20 break, reaction force against the collision body 66 is able to be generated while the front side members 14F, the inner members 14A, and the outer members 14B of the side members 14 deform. Also, the position of the connecting portions 20 is not limited to the front end portion 18F of the tunnel portion 18. That is, the connecting portions 20 may also be provided at a portion other than the front end portion 18F.

Also, as shown in FIG. 10, as the front portion of the vehicle deforms, the front wheel 30 is forced toward the rear and contacts the front end portion 28A of the side sill 28, transmitting the front impact load F2 (see FIG. 9) in the direction of arrow C to the side sill 28. Accordingly, the front impact load F2 is able to be efficiently transmitted to the side sill 28.

In this example embodiment, when the inner members 14A are connected together inside the tunnel portion 18, as shown in FIGS. 4 and 5, the space below the tunnel portion 18 of the floor 16, as well as the space below the portion 18B of the floor 16 other than the tunnel portion 18, is able to be used effectively. For example, that space can be used to mount a battery for a hybrid vehicle, or a fuel tank or the like.

Also, in this example embodiment, when the inner members 14A are connected to the side wall portions 18A of the tunnel portion 18, as shown in FIGS. 6 and 7, the inner members 14A do not pass through the tunnel portion 18. Therefore, the space below the tunnel portion 18 of the floor 16 is able to be used more effectively. For example, the exhaust pipe 45 or the like is able to be arranged inside the tunnel portion 18.

Figure 12:
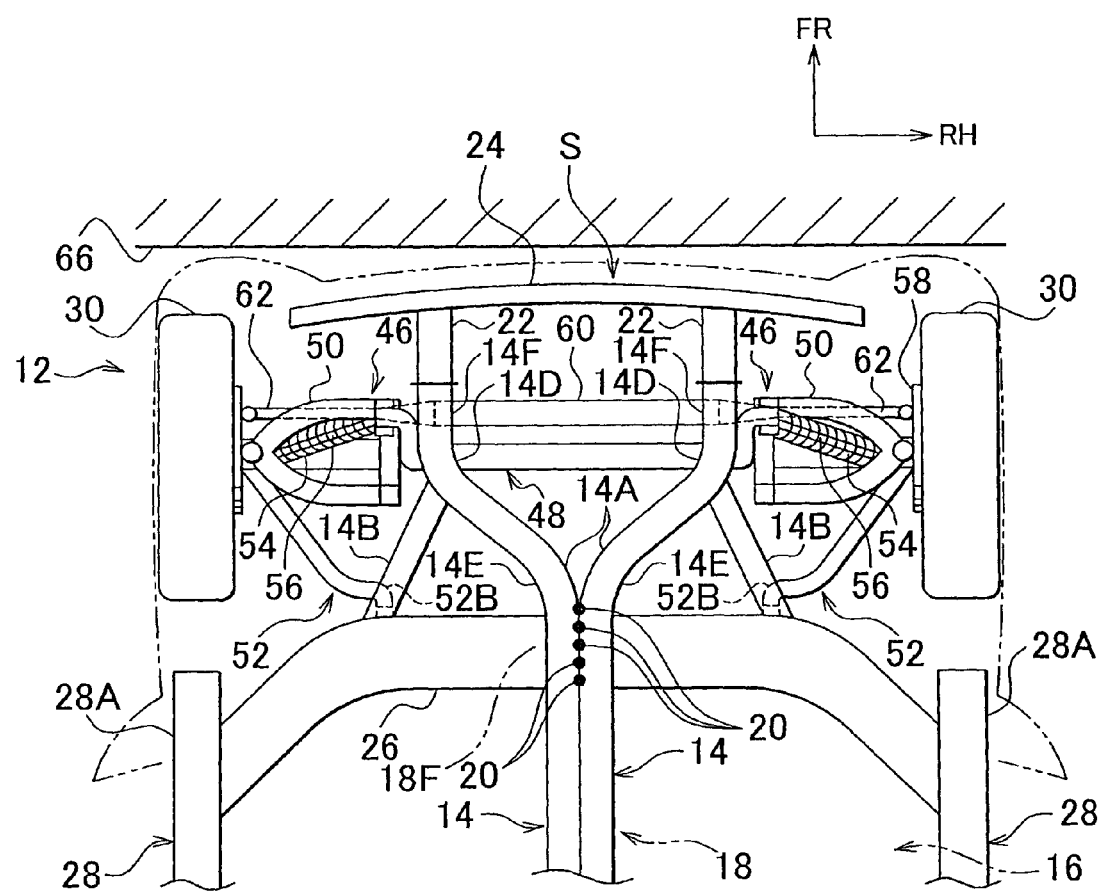
FIG. 12 is a plan view of the front portion of the vehicle just before colliding with a collision body during a full-wrap frontal collision (i.e., a full-width frontal collision)
Figure 13:
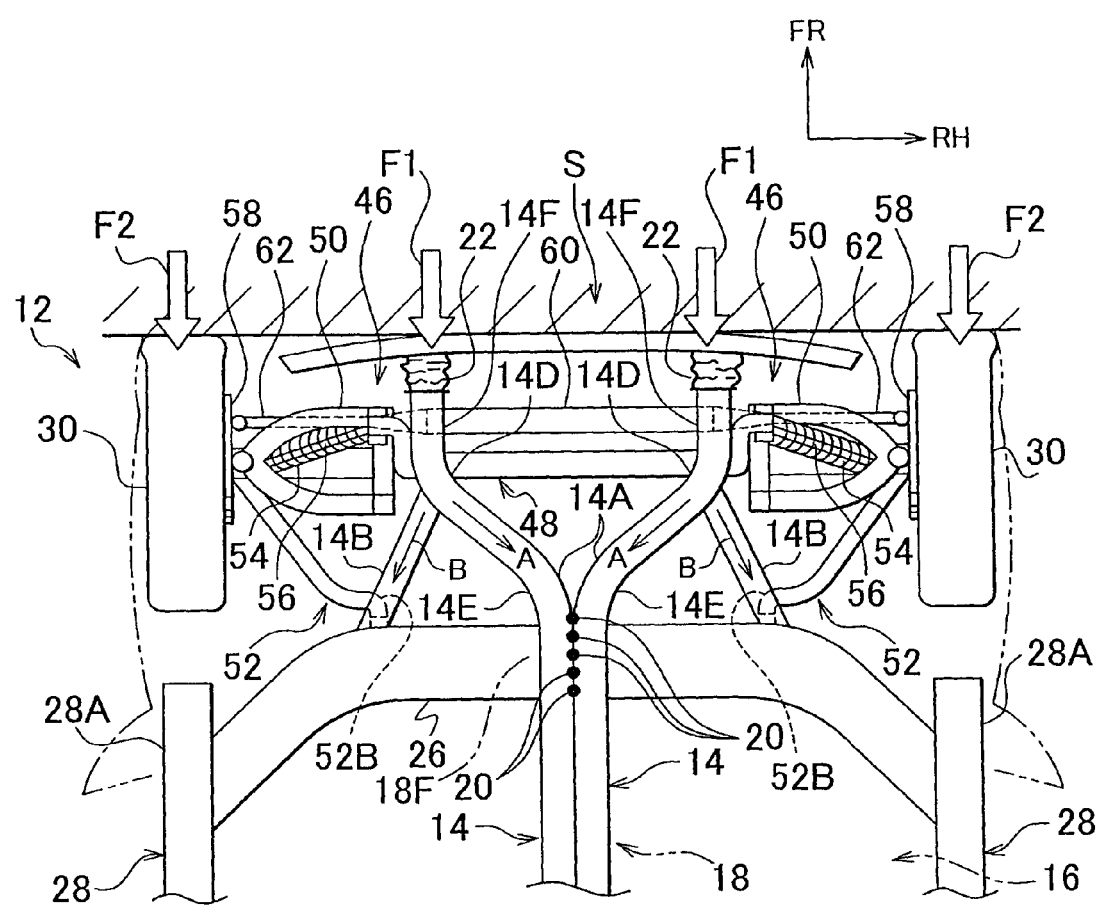
FIG. 13 is a plan view of the front of a vehicle at the beginning of impact during the full-wrap frontal collision (i.e., a full-width frontal collision)

Next, a case in which the entire front portion of the vehicle collides with the collision body 66 in a full-wrap frontal collision (i.e., a full-width frontal collision) will be described with reference to FIGS. 12 and 14. When this kind of a full-wrap frontal collision occurs, the front impact load F1 is input to both front side members 14F via the bumper reinforcement 24 and the crash boxes 22, as shown in FIG. 13. At this time, a certain degree of shock is absorbed by the crash boxes 22 axially compressing and deforming. Also, as the front portion of the vehicle continues to deform, the front impact load F2 from the collision body 66 is input to the front wheels 30.

At this time, the front impact load F1 input to the side members 14 (i.e., the front side members 14F) is distributed to the inner members 14A (in the direction of arrow A) and the outer members 14B (in the direction of arrow B). The front impact load F1 is transmitted, for example, to the cross member 26 as well as to the rear of the inner members 14A along the tunnel portion 18 in the longitudinal direction of the vehicle. The load transmitted to the cross member 26 is also transmitted to the side sills 28. The front side members 14F and the inner members 14A of the side members 14 are formed straight when viewed from the side of the vehicle, so localized deformation of the floor can be suppressed just as it is in the case of the offset collision described above.

Figure 14:
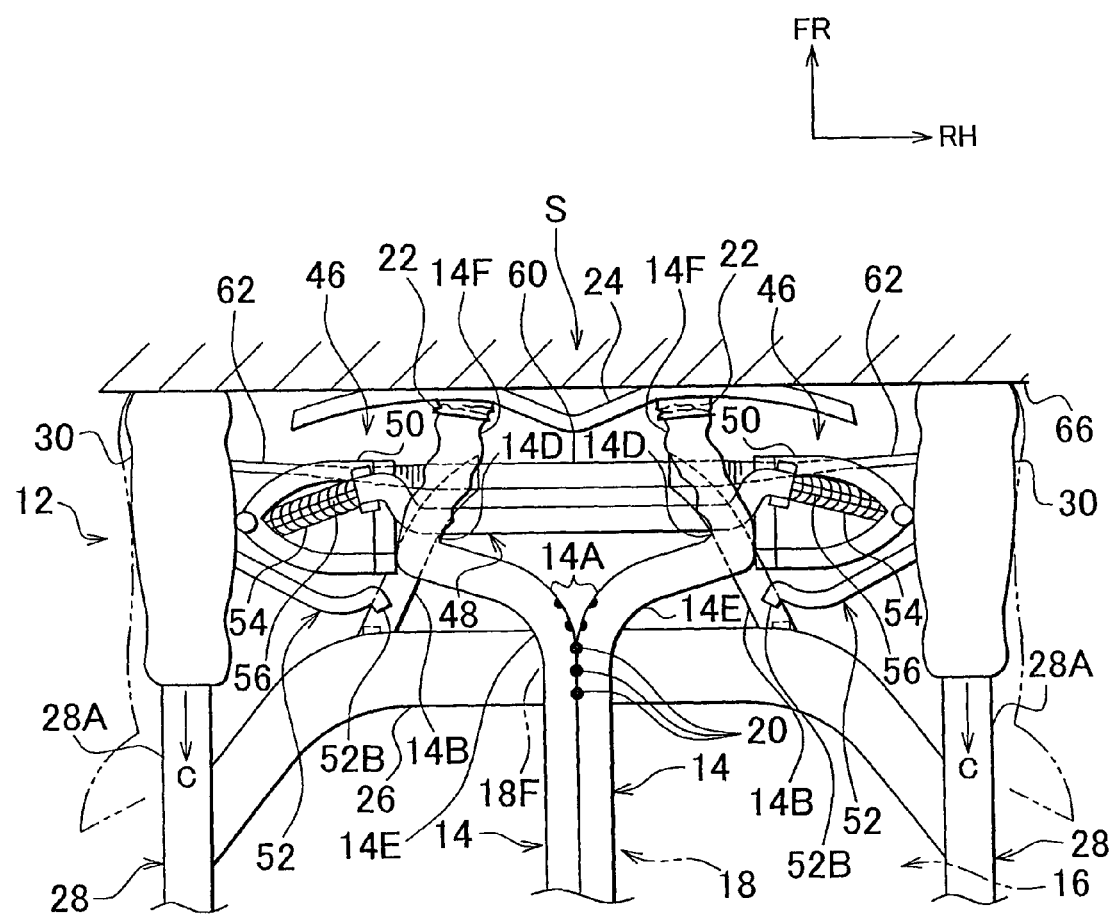
FIG. 14 is a plan view of the vehicle further deformed from the state shown in FIG. 13.
Figure 15:
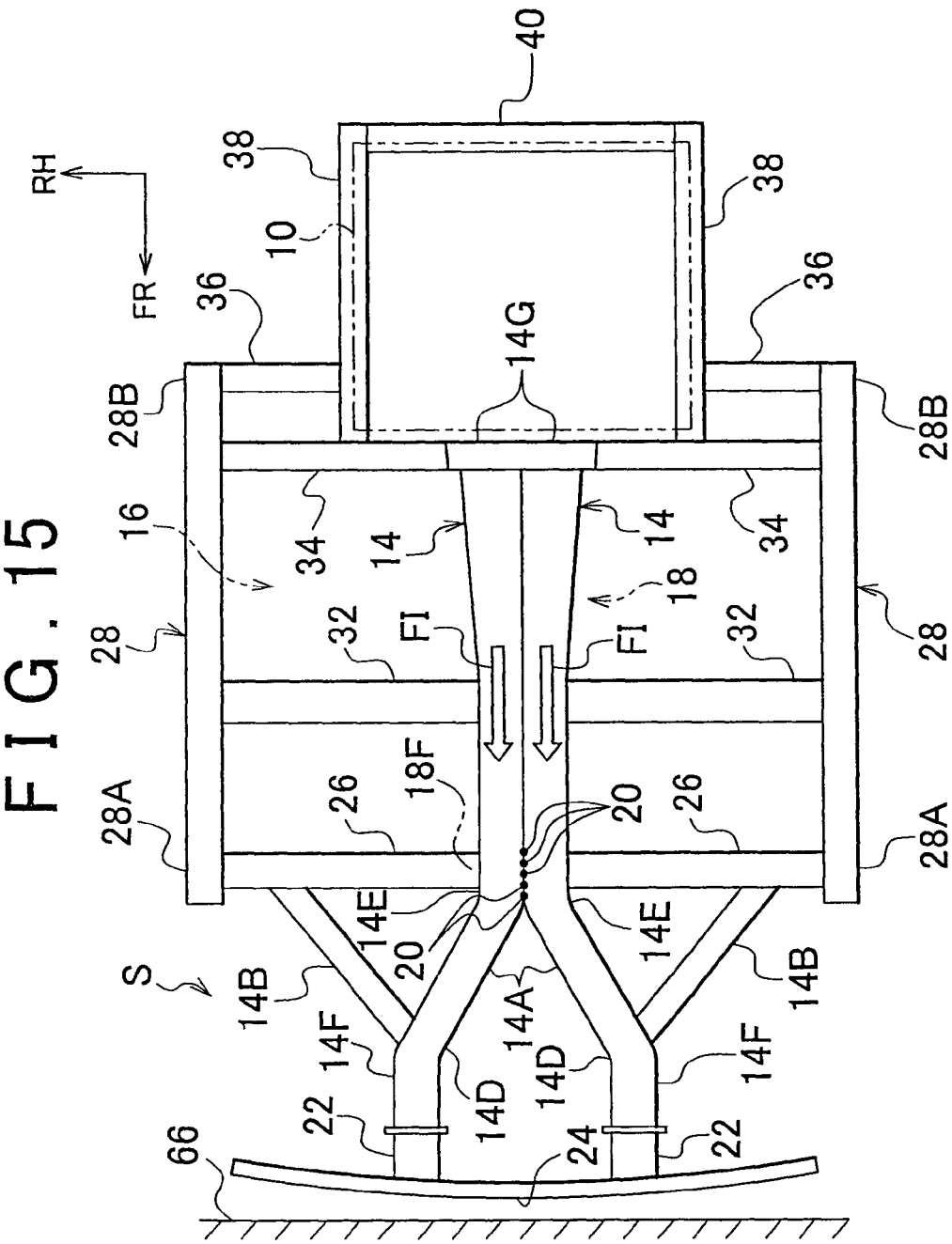
FIG. 15 is a plan view showing that a load from the inertia mass of a power unit is transmitted forward of the side members via the inner members.

Also, as the front portion of the vehicle continues to deform from the front impact load F1 (see FIG. 13), some of the connecting portions 20, such as the two connecting portions 20 that are farthest forward, for example, of the inner members 14 break and separate in the vehicle width direction, as shown in FIG. 14. Having the connecting portions 20 break and separate in this way enables the side members 14 to deform not only at the area of the front side members 14F, but also at the area of the inner members 14A which are located at the front end portion 18F of the tunnel portion 18. As a result, the shock during a frontal collision is able to be effectively absorbed. Accordingly, localized deformation of the floor 16 is able to be suppressed, making it possible to reduce the number of reinforcements, not shown, for reinforcing the floor 16, which in turn enables the weight of the vehicle frame to be reduced.

Moreover, as the front portion of the vehicle deforms, the front wheels 30 are forced toward the rear and contact the front end portions 28A of the side sills 28, transmitting the front impact load F2 (see FIG. 13) in the direction of arrow C to the side sills 28. Accordingly, the front impact load F2 is able to be efficiently transmitted to the side sills 28.

With the vehicle frame structure S according to this example embodiment, the power unit 10 is arranged behind the inner members 14A in the longitudinal direction of the vehicle, and opposing the rear ends 14G of the inner members 14A in the longitudinal direction of the vehicle. Therefore, during a frontal collision of the vehicle 12, a load F1 from the inertia mass of the power unit 10 can be transmitted forward of the side members 14 via the inner members 14A. The load is able to be transmitted in this way regardless of whether the collision is an offset collision or a full-wrap frontal collision. Therefore, even with the vehicle 12 which has the power unit 10 mounted in the rear, the vehicle frame can be made lighter while ensuring the ability to absorb the shock during a frontal collision.

In addition, with the vehicle frame structure according to this example embodiment, the inner members 14A of the side members 14 extend in the longitudinal direction of the vehicle along the tunnel portion 18. These inner members 14A are light and rigid, so they are able to suppress vibrations generated while the power unit 10 is idling, for example. Also, the ability to absorb the shock from a side collision is also able to be improved.

Incidentally, the number of connecting portions 20 of the inner members 14A at the front end portion 18F of the tunnel portion 18 is not limited to five. For example, only the two that are the farthest forward in the longitudinal direction of the vehicle may be provided. Also, it is preferable to have some of the plurality of connecting portions 20, such as the front two, be positioned in front of the cross member 26. This is because when these connecting portions 20 break and the inner members 14A deform, the effect on the floor 16 is reduced so localized deformation of the floor 16 can be suppressed even more.

Also, in this example embodiment, the suspension system 46 is a double wishbone type suspension system but it is not limited to this. For example, it may alternatively be a MacPherson strut or other type of suspension system.

The power unit 10 is not limited to being mounted in the rear of the vehicle. If the power unit 10 is small, it may also be mounted in the front of the vehicle.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. A vehicle frame structure comprising:
a tunnel portion provided in a floor;
left and right side members each of which includes:
a front side member which is at the front of the vehicle and extends in the longitudinal direction of the vehicle on the corresponding left or right side in the vehicle width direction;
an inner member that is toward the inside in the vehicle width direction; and
an outer member that is toward the outside in the vehicle width direction, the inner member and the outer member branching off from the front side member in a direction that is toward the rear of the vehicle, the inner member extending toward the rear of the vehicle along the tunnel portion, the inner members of the left and right side members being connected together by a plurality of connecting portions in the longitudinal direction of the vehicle at least at a location corresponding to a front portion side of the tunnel portion;
left and right side sills each of which extends in the longitudinal direction of the vehicle, and are provided at lower portions of respective left and right side portions of the vehicle; and
a cross member that connects front end portions of the left and right side sills together, wherein:
the connecting portions break when a front impact load is input to at least one of the side members; and
a rear end of the outer member is connected to a front surface of the cross member.

2. The vehicle frame structure according to claim 1, wherein the front side members and the inner members are formed generally straight when viewed from the side of the vehicle.

3. The vehicle frame structure according to claim 1, wherein the inner members are connected together inside the tunnel portion.

4. The vehicle frame structure according to claim 1, wherein the inner members are connected together via the tunnel portion, one inner member being connected to one side wall portion, which is on one side in the vehicle width direction, of the tunnel portion and the other inner member being connected to the other side wall portion, which is on the other side in the vehicle width direction, of the tunnel portion.

5. The vehicle frame structure according to claim 1, wherein a power unit is arranged behind the inner members in the longitudinal direction of the vehicle, and opposing the rear ends of the inner members in the longitudinal direction of the vehicle.

6. The vehicle frame structure according to claim 1, wherein the tunnel portion is positioned in a center portion of the floor in the vehicle width direction.

7. The vehicle frame structure according to claim 6, wherein a curved portion is provided at the junction between each front side member and each inner member, and a curved portion is provided at a portion of each inner member that is between the junction and the connecting portions.

8. The vehicle frame structure according to claim 6, wherein each of the inner members extends from the corresponding rear end of the corresponding front side member diagonally back toward the front portion of the tunnel portion, and then extends from the front portion of the tunnel portion toward the rear in the direction of the tunnel portion.

* * * * *